(12) United States Patent
Yamawaki et al.

(10) Patent No.: US 11,359,166 B2
(45) Date of Patent: *Jun. 14, 2022

(54) FABRIC TREATMENT COMPOSITION

(71) Applicant: KAO CORPORATION, Tokyo (JP)

(72) Inventors: Yukiko Yamawaki, Wakayama (JP); Takanori Saito, Kita-ku (JP); Yoichiro Imori, Wakayama (JP); Akihiro Koyama, Adachi-ku (JP)

(73) Assignee: KAO CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/769,542

(22) PCT Filed: Dec. 5, 2018

(86) PCT No.: PCT/JP2018/044722
§ 371 (c)(1),
(2) Date: Jun. 3, 2020

(87) PCT Pub. No.: WO2019/111949
PCT Pub. Date: Jun. 13, 2019

(65) Prior Publication Data
US 2020/0392429 A1    Dec. 17, 2020

(30) Foreign Application Priority Data
Dec. 6, 2017  (JP) .............. JP2017-234711

(51) Int. Cl.
C11D 3/00     (2006.01)
C11D 3/30     (2006.01)
C11D 11/00    (2006.01)
D06M 15/09    (2006.01)

(52) U.S. Cl.
CPC ............ C11D 3/0036 (2013.01); C11D 3/30 (2013.01); C11D 11/0017 (2013.01); D06M 15/09 (2013.01)

(58) Field of Classification Search
CPC ....... C11D 3/0036; C11D 11/017; C11D 3/30; D06M 15/09
See application file for complete search history.

(56) References Cited

U.S. PATENT DOCUMENTS

| 4,000,093 | A | * | 12/1976 | Nicol | ..................... | C11D 1/146 510/299 |
| 4,663,159 | A | | 5/1987 | Brode, II et al. | | |
| 5,948,744 | A | * | 9/1999 | Baillely | .................. | C11D 3/225 510/299 |
| 6,833,347 | B1 | * | 12/2004 | Wang | ..................... | C11D 3/227 510/276 |
| 2004/0151681 | A1 | | 8/2004 | Busk et al. | | |
| 2005/0043415 | A1 | * | 2/2005 | Munoz | ..................... | C11D 1/29 516/14 |
| 2006/0070294 | A1 | * | 4/2006 | Spittle | ................ | A01G 13/0268 47/9 |
| 2006/0182703 | A1 | | 8/2006 | Arisz et al. | | |
| 2006/0199742 | A1 | * | 9/2006 | Arisz | ..................... | A61Q 11/00 507/114 |
| 2008/0280807 | A1 | * | 11/2008 | Grainger | .................. | C11D 1/62 510/522 |
| 2010/0204079 | A1 | * | 8/2010 | McAuliffe | ......... | C11D 3/38636 510/320 |
| 2011/0177018 | A1 | * | 7/2011 | Lipic | ...................... | A61K 8/731 424/70.13 |
| 2011/0268778 | A1 | * | 11/2011 | Dihora | ..................... | A61K 8/11 424/401 |
| 2011/0268802 | A1 | * | 11/2011 | Dihora | ................ | C09B 67/0097 424/489 |
| 2011/0269658 | A1 | * | 11/2011 | Dihora | .................... | C11D 3/505 510/119 |
| 2011/0274627 | A1 | * | 11/2011 | Alwattari | ................. | A61Q 9/02 424/43 |
| 2011/0318285 | A1 | | 12/2011 | Erazo-Majewicz et al. | | |
| 2013/0130949 | A1 | | 5/2013 | Partain, III et al. | | |
| 2013/0209388 | A1 | * | 8/2013 | Erazo-Majewicz | ......................... | A61K 8/8158 424/70.13 |
| 2015/0239993 | A1 | | 8/2015 | Miyoshi et al. | | |

(Continued)

FOREIGN PATENT DOCUMENTS

| CN | 1247558 A | 3/2000 |
| CN | 101171264 A | 4/2008 |

(Continued)

OTHER PUBLICATIONS

Extended European Search Report dated Aug. 9, 2021 in Patent Application No. 18886444.1, 8 pages.
Extended European Search Report dated Aug. 4, 2021 in Patent Application No. 18885732.0, 8 pages.
Extended European Search Report dated Jul. 26, 2021 in Patent Application No. 18885583.7.
Neda Beheshti et al, "Interaction behaviors in aqueous solutions of negatively and positively charged hydrophobically modified hydroxyethylccllulose in the presence of an anionic surfactant", Colloids and Surfaces A: Physiochemical and Engineering Aspects 328 2008 p. 79-89.
Sumei Yao (editor), Basic Chemistry (2nd Edition), Aug. 2017, p. 218, Ocean Press, Beijing, P. R. China.

(Continued)

Primary Examiner — Liam J Heincer
Assistant Examiner — M. Reza Asdjodi
(74) Attorney, Agent, or Firm — Element IP, PLC

(57) ABSTRACT

The present invention relates to a fabric treatment composition capable of enhancing cleaning properties of a soil during cleaning through treatment of a fabric to be treated and a method for treating a fabric with the fabric treatment composition. The fabric treatment composition is a fabric treatment composition containing a hydroxyalkyl cellulose (A) in which a hydroxyalkyl cellulose is bound to at least one selected from a cationic group and a hydrophobic group including a hydrocarbon group having 4 or more carbon atoms, the content of a surfactant (B) being 3.5 parts by mass or less relative to 1 part by mass of the hydroxyalkyl cellulose (A).

20 Claims, No Drawings

(56) References Cited

U.S. PATENT DOCUMENTS

| | | | |
|---|---|---|---|
| 2016/0122441 A1 | 5/2016 | Miyoshi et al. | |
| 2017/0335242 A1* | 11/2017 | Eldredge | C07C 211/63 |
| 2020/0392429 A1* | 12/2020 | Yamawaki | C11D 11/0017 |

FOREIGN PATENT DOCUMENTS

| | | | |
|---|---|---|---|
| CN | 101415809 A | 4/2009 | |
| CN | 101935357 A | 1/2011 | |
| CN | 102391381 A | 3/2012 | |
| CN | 105142731 A | 12/2015 | |
| EP | 1100851 B1 | 7/2004 | |
| EP | 3722358 A1 | 10/2020 | |
| EP | 3722400 A1 | 10/2020 | |
| EP | 3722497 A1 | 10/2020 | |
| EP | 3722498 A1 | 10/2020 | |
| JP | 3-77201 B2 | 12/1991 | |
| JP | 6-183939 A | 7/1994 | |
| JP | 10-195772 A | 7/1998 | |
| JP | 11-106401 A | 4/1999 | |
| JP | 2000-80564 A | 3/2000 | |
| JP | 2000-178303 A | 6/2000 | |
| JP | 2000178303 A | 6/2000 | |
| JP | 2001-181301 A | 7/2001 | |
| JP | 2003-301376 A | 10/2003 | |
| JP | 2004-519519 A | 7/2004 | |
| JP | 2004189937 A | 7/2004 | |
| JP | 2007-45991 A | 2/2007 | |
| JP | 2007-145903 A | 6/2007 | |
| JP | 2007145903 A | 6/2007 | |
| JP | 2008-156764 A | 7/2008 | |
| JP | 2008-535937 A | 9/2008 | |
| JP | 2013-529644 A | 7/2013 | |
| JP | 2014-169417 A | 9/2014 | |
| JP | 2015-168666 A | 9/2015 | |
| JP | 2015-227412 A | 12/2015 | |
| JP | 2016-113724 A | 6/2016 | |
| RU | 2479628 C2 | 4/2013 | |
| RU | 2623909 C2 | 6/2017 | |
| WO | WO-9829528 A2 * | 7/1998 | C11D 1/86 |
| WO | WO-2006094582 A1 | 9/2006 | |
| WO | WO-2007120547 A1 | 10/2007 | |
| WO | WO-2011121073 A1 | 10/2011 | |
| WO | WO 2012/021626 A2 | 2/2012 | |
| WO | WO 2013/068771 A1 | 5/2013 | |
| WO | WO 2014/087968 A1 | 6/2014 | |
| WO | WO 2016/077207 A1 | 5/2016 | |
| WO | WO-2017142869 A | 8/2017 | |
| WO | WO-2019111949 A1 * | 6/2019 | D06M 15/09 |

OTHER PUBLICATIONS

International Search Report for PCT/JP2018/044722 (PCT/ISA/210) dated Feb. 12, 2019.

A.D. Alekseev et al, "Influence of Surfactants on Capacity of Low-Phosphatic Technical Detergents", Belarusian State Technological University, No. 2, 2017, pp. 159-163 (with English abstract).

Combined Office Action and Search Report dated Nov. 18, 2021 in Russian Patent Application No. 2020118530, 10 pages (with English translation).

Combined Office Action and Search Report dated Nov. 18. 2021 in Russian Patent Application No. 2020118531, 9 pages (with English translation).

V. M. Sutvasin et al, Khimiva i fizika polymerov: Uchebnoe posobie (Chemistry and Physics of Polymers: a Textbook).—Tomsk: TPU publishers, 2003, 6 pages.

U.S. Appl. No. 16/769,446, filed Jun. 3, 2020.

U.S. Appl. No. 16/769,527, filed Jun. 3, 2020.

U.S. Appl. No. 16/769,424, filed Jun. 3, 2020.

Office Action dated Aug. 18, 2021 in co-pending U.S. Appl. No. 16/769,527, 10 pages.

Supplemeutaty European Search Report dated Aug. 18, 2021 in Patent Application No. 18886039.9, 6 pages.

International Search Report for PCT/JP2018/044718 (PCT/ISA/210) dated Jan. 15, 2019, with English translation.

International Search Report for PCT/JP2018/044720 (PCT/ISA/210) dated Mar. 5, 2019, with English translation.

International Search Report for PCT/JP2018/044721 (PCT/ISA/210) dated Feb. 12, 2019, with English translation.

* cited by examiner

FABRIC TREATMENT COMPOSITION

FIELD OF THE INVENTION

The present invention relates to a fabric treatment composition.

BACKGROUND OF THE INVENTION

A polysaccharide derivative is used as a blending component of hair cleansing agent compositions, such as a shampoo, a rinse, a treatment, and a conditioner, or cleaning agent compositions of clothes, and its applications include many divergences.

JP 2000-178303 A (PTL 1) describes, as a laundry finishing agent, a polysaccharide derivative substituted with specified alkyl group, carboxymethyl group, and cationic group.

JP 2015-168666 (PTL 2) describes an aqueous hair cleansing agent containing specified surfactant, cationic group-containing cellulose ether, and glyceryl ether.

JP 2013-529644 A (PTL 3) discloses a personal care composition additive including a specified substantive polymer selected from a polysaccharide and a synthetic polymer containing a cationic monomer.

SUMMARY OF THE INVENTION

Solution to Problem

The present invention relates to the following <1> and <2>.
<1> A fabric treatment composition containing a hydroxyalkyl cellulose (A) in which a hydroxyalkyl cellulose is bound to at least one selected from a cationic group and a hydrophobic group including a hydrocarbon group having 4 or more carbon atoms, the content of a surfactant (B) being 3.5 parts by mass or less relative to 1 part by mass of the hydroxyalkyl cellulose (A).
<2> A method for treating a fabric, including a step of impregnating a fabric to be treated with the fabric treatment composition as set forth in <1>.

DETAILED DESCRIPTION OF THE INVENTION

A fabric treatment composition capable of enhancing cleaning properties of a soil during cleaning is demanded. However, conventional compositions are unable to exhibit a sufficient performance.

The present invention relates to a fabric treatment composition capable of enhancing cleaning properties of a soil during cleaning through treatment of a fabric, and a method for treating a fabric with the fabric treatment composition.

The present inventors have found that the aforementioned problem can be solved by containing a specified hydroxyalkyl cellulose (A) and controlling the content of a surfactant to 3.5 parts by mass or less relative to 1 part by mass of the hydroxyalkyl cellulose (A).

In accordance with the present invention, a fabric treatment composition capable of enhancing cleaning properties of a soil during cleaning through treatment of a fabric, a method for treating a fabric with the fabric treatment composition, and a fabric treated with the aforementioned method can be provided.

In the following description, the "soil release performance" means a performance of enhancing easiness of soil removal during cleaning through treatment of a fabric.
[Fabric Treatment Composition]

The fabric treatment composition of the present invention contains a hydroxyalkyl cellulose (A) in which a hydroxyalkyl cellulose is bound to at least one selected from a cationic group and a hydrophobic group including a hydrocarbon group having 4 or more carbon atoms (hereinafter also referred to simply as "hydrophobic group"), the content of a surfactant (B) being 3.5 parts by mass or less relative to 1 part by mass of the hydroxyalkyl cellulose (A).

The present inventors have found that when the fabric treatment composition of the present invention which contains the hydroxyalkyl cellulose (A), the content of the surfactant falling within a specified range relative to the hydroxyalkyl cellulose, is treated on a fabric to be treated, such as clothing, the performance of making it easy to remove a soil during cleaning is enhanced. Although a detailed action mechanism thereof is not elucidated yet, it is partly estimated as follows.

In the present invention, as for the hydroxyalkyl cellulose (A), in view of the fact that the amount of the surfactant (B) falls within a specified range, its adsorption properties on the surface of a fabric to be treated, such as clothing, increase, and uniform and appropriate hydrophilicity is provided owing to the hydroxyalkyl cellulose (A) attached on the surface. As a result, it may be estimated that the performance of making it easy to remove a soil during cleaning is enhanced. Furthermore, in the case where the hydroxyalkyl cellulose (A) has a cationic group and/or a hydrophobic group, it may be estimated that the adsorption mode on the fabric is controlled, and the performance is further enhanced.

<Hydroxyalkyl Cellulose (A)>

The fabric treatment composition of the present invention contains the hydroxyalkyl cellulose (A), the hydroxyalkyl cellulose (A) being bound to at least one selected from a cationic group and a hydrophobic group including a hydrocarbon group having 4 or more carbon atoms. Here, from the viewpoint of soil release performance, the hydroxyalkyl cellulose (A) is bound to at least a cationic group or a hydrophobic group, and it is preferred that both the cationic group and the hydrophobic group are bound.

From the viewpoint of soil release performance, a hydroxyalkyl group which the hydroxyalkyl cellulose has is preferably at least one selected from a hydroxyethyl group and a hydroxypropyl group, more preferably only a hydroxyethyl group or a hydroxypropyl group, and still more preferably only a hydroxyethyl group. The hydroxyalkyl cellulose may have both a hydroxyethyl group and a hydroxypropyl group, and it preferably has either one of them, and more preferably has only a hydroxyethyl group.

From the viewpoint of soil release performance, the hydroxyalkyl cellulose is preferably hydroxyethyl cellulose (hereinafter also referred to "HEC"), hydroxypropyl cellulose, or hydroxybutyl cellulose, more preferably HEC or hydroxypropyl cellulose, and still more preferably HEC.

In the present invention, from the viewpoint of soil release performance, the hydroxyalkyl cellulose (A) is preferably hydroxyethyl cellulose (A) (hereinafter also referred to as "HEC (A)"), hydroxypropyl cellulose (A), or hydroxybutyl cellulose (A), more preferably HEC (A) or hydroxypropyl cellulose (A), and still more preferably HEC (A).

From the viewpoint of solubility, a degree of substitution of the hydroxyalkyl group in the hydroxyalkyl cellulose is preferably 0.1 or more, more preferably 0.5 or more, still more preferably 1 or more, and yet still more preferably 1.5 or more, and from the viewpoint of cleaning performance, it is preferably 10 or less, more preferably 8 or less, still more preferably 5 or less, and yet still more preferably 3 or less.

In the present invention, the degree of substitution of an X group is a molar average degree of substitution of the X group and means a number of substitutions of the X group per the constituent monosaccharide unit of cellulose. For example, the "degree of substitution of the hydroxyethyl group" means an average molar number of the hydroxyethyl group introduced (bound) per mol of the anhydroglucose unit.

In the case where the hydroxyalkyl cellulose has both a hydroxyethyl group and a hydroxypropyl group, the degree of substitution of the hydroxyalkyl group refers to a sum total of the degree of substitution of the hydroxyethyl group and the degree of substitution of the hydroxypropyl group.

(Weight Average Molecular Weight)

In the present invention, from the viewpoint of soil release performance, the weight average molecular weight of the hydroxyalkyl cellulose is preferably 1,000 or more, more preferably 10,000 or more, still more preferably 30,000 or more, yet still more preferably 50,000 or more, even yet still more preferably 70,000 or more, even still more preferably 100,000 or more, and even still more further more preferably 130,000 or more, and from the viewpoint of solubility in the composition, it is preferably 3,000,000 or less, more preferably 1,500,000 or less, still more preferably 1,200,000 or less, yet still more preferably 790,000 or less, even yet still more preferably 600,000 or less, even still more preferably 500,000 or less, and even still more further more preferably 400,000 or less.

In the case where the hydroxyalkyl cellulose is procured as a product and provided for use, published values by a manufacturer may be adopted.

(Cationic Group)

In the present invention, as for the hydroxyalkyl cellulose (A), it is preferable that a cationic group is bound to a group resulting from eliminating a hydrogen atom from a hydroxy group of the hydroxyalkyl cellulose. The aforementioned hydroxy group includes a hydroxy group which the hydroxyalkyl group bound to the cellulose has and a hydroxy group which glucose forming a cellulose structure has (a hydroxy group to which the hydroxyalkyl group is not bound).

The cationic group which the hydroxyalkyl cellulose (A) has preferably includes a quaternary ammonium cation, and is preferably represented by the following formula (2-1) or formula (2-2) as a whole.

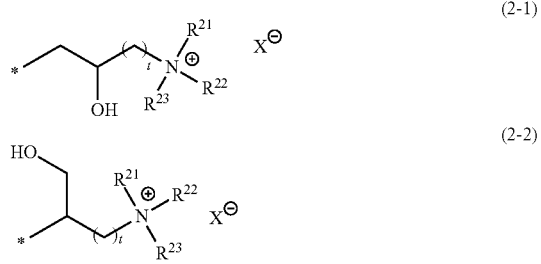

In the formula (2-1) and formula (2-2), $R^{21}$ to $R^{23}$ each independently represent a hydrocarbon group having 1 or more and 3 or less carbon atoms; $X^{1a-}$ represents an anion; t represents an integer of 0 or more and 3 or less; and * represents a binding position to a group resulting from eliminating a hydrogen atom from a hydroxy group of the hydroxyalkyl cellulose.

$R^{21}$ to $R^{23}$ are each independently preferably a linear or branched hydrocarbon group having 1 or more and 3 or less carbon atoms, and more preferably a methyl group or an ethyl group. Still more preferably, all of $R^{21}$ to $R^{23}$ are a methyl group or an ethyl group, and yet still more preferably, all of $R^{21}$ to $R^{23}$ are a methyl group.

t is preferably an integer of 1 or more and 3 or less, more preferably 1 or 2, and still more preferably 1.

$X^{1a-}$ is a counter ion of the quaternary ammonium cation, and examples thereof include an alkyl sulfate ion having 1 or more and 3 or less carbon atoms, a sulfate ion, a phosphate ion, a carboxylate ion having 1 or more and 3 or less carbon atoms (e.g., a formate ion, an acetate ion, and a propionate ion), and a halide ion.

Of these, from the viewpoint of easiness of production and easiness of raw material availability, $X^{1a-}$ is preferably at least one selected from a methyl sulfate ion, an ethyl sulfate ion, a chloride ion, and a bromide ion, and from the viewpoint of solubility in water and chemical stability of the resulting modified hydroxyalkyl cellulose, $X^{1a-}$ is more preferably a chloride ion.

$X^{1a-}$ may be used alone or in combination of two or more thereof.

The group represented by the formula (2-1) or formula (2-2) can be obtained by using an introducing agent of the cationic group (hereinafter also referred to as "cationizing agent"). Examples of the cationizing agent include a glycidyltrialkylammonium chloride and a 3-chloro-2-hydroxypropyltrialkylammonium chloride, and from the viewpoint of easiness of raw material availability and chemical stability, a glycidyltrialkylammonium chloride is preferred.

These cationizing agents can be used alone or in combination of two or more thereof.

From the viewpoint of soil release performance, a degree of substitution of the cationic group (hereinafter also referred as "$MS_C$") in the modified hydroxyalkyl cellulose of the present invention is preferably 0.001 or more, more preferably 0.005 or more, still more preferably 0.01 or more, yet still more preferably 0.02 or more, even yet still more preferably 0.05 or more, and even still more preferably 0.07 or more, and it is preferably 1 or less, more preferably 0.7 or less, still more preferably 0.4 or less, yet still more preferably 0.35 or less, even yet still more preferably 0.3 or less, even still more preferably 0.25 or less, even still more further preferably 0.2 or less, even yet still more further preferably 0.15 or less, and even yet still more further preferably 0.1 or less.

The degree of substitution of the cationic group can be measured by the method described in the section of Examples.

(Hydrophobic Group)

In the present invention, as for the hydroxyalkyl cellulose (A), it is preferred that the hydroxyalkyl cellulose is bound to a hydrophobic group including a hydrocarbon group having 4 or more carbon atoms.

From the viewpoint of soil release performance, the hydrocarbon group which the hydrophobic group includes is preferably an alkyl group or an alkenyl group, more preferably an alkyl group, still more preferably a linear or branched alkyl group, and yet still more preferably a linear alkyl group.

From the viewpoint of soil release performance, the carbon number of the hydrocarbon group which the hydrophobic group includes is 4 or more, preferably 6 or more, more preferably 8 or more, and still more preferably 10 or more, and it is preferably 24 or less, more preferably 22 or less, still more preferably 18 or less, yet still more preferably 16 or less, and even yet still more preferably 14 or less.

The hydrophobic group is preferably a group represented by the following formula (1).

*—Z—R¹         (1)

In the formula (1), Z represents a single bond or a hydrocarbon group having at least one selected from an oxygen atom and a nitrogen atom; $R^1$ represents a hydrocarbon group having 4 or more carbon atoms; and * represents a binding position to a group resulting from eliminating a hydrogen atom from a hydroxy group of a hydroxyalkyl cellulose.

A preferred embodiment of $R^1$ is synonymous with the hydrocarbon group of the aforementioned hydrophobic group.

$R^1$ is defined such that the carbon number of the hydrocarbon group becomes maximum. In consequence, in the formula (1), the atom in Z bound to $R^1$ is, for example, an oxygen atom, a nitrogen atom, carbonate carbon, a carbon atom to which a hydroxy group is bound, or a carbon atom to which a hydroxyalkyl group is bound.

Z represents a single bond or a hydrocarbon group having at least one selected from an oxygen atom and a nitrogen atom. Z is preferably a single bond or a hydrocarbon group having at least an oxygen atom, and more preferably a single bond or a hydrocarbon group having an oxygen atom. The aforementioned hydrocarbon group is preferably an alkylene group; a methylene group of a part of the alkylene group may be substituted with an ether bond, a part of the methylene group may be substituted with a carbonyl group (—C(=O)—), and a part of the methylene group may be substituted with an amide bond; and a hydrogen atom of a part of the alkylene group may be substituted with a hydroxy group, an alkyl group, or a hydroxyalkyl group.

In the case where Z is a hydrocarbon group having an oxygen atom (hereinafter also referred to as "hydrocarbon group (Z)"), the hydrocarbon group (Z) preferably includes an epoxy group-derived group, an oxyglycidyl group-derived group, or group derived from a carboxylic acid (or its anhydride), and from the viewpoint of soil release performance, the hydrocarbon group (Z) more preferably includes an oxyglycidyl group-derived group.

The group represented by the formula (1) more preferably includes any one of groups represented by the following formulae (1-1-1) to (1-4).

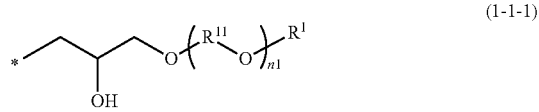 (1-1-1)

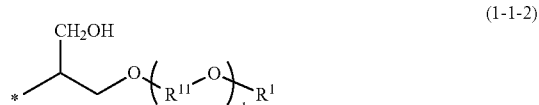 (1-1-2)

(1-2-1)

(1-2-2)

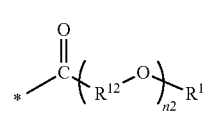 (1-3)

(1-4)

In the formula (1-1-1) to formula (1-4), $R^{11}$ and $R^{12}$ each independently represent an alkylene group having 2 to 4 carbon atoms; $R^1$ is synonymous with $R^1$ in the formula (1); * represents a binding position to a group resulting from eliminating a hydrogen atom from a hydroxy group of the hydroxyalkyl cellulose; n1 represents an addition molar number of —$R^{11}$—O—; n2 represents an addition molar number of —$R^{12}$—O—; and n1 and n2 are each an integer of 0 or more and 30 or less.

A preferred embodiment of $R^1$ in the formula (1-1-1) to formula (1-4) is synonymous with $R^1$ in the formula (1). The groups resulting from eliminating $R^1$ from the formula (1-1-1) to formula (1-4) are preferred embodiments of the hydrocarbon group Z.

$R^{11}$ and $R^{12}$ are each independently preferably an ethylene group or a propylene group, and more preferably an ethylene group. The carbon number of each of $R^{11}$ and $R^{12}$ is preferably 2 or more and 3 or less. In the case where a plurality of each of $R^{11}$ and $R^{12}$ exist, they may be the same as or different from each other, respectively. n1 and n2 are each preferably 20 or less, more preferably 10 or less, still more preferably 5 or less, yet still more preferably 3 or less, and even yet still more preferably 1 or less, and they may be 0 or more, and even still more preferably 0.

In the case where the group represented by the formula (1) contains at least one group selected from a group represented by the formula (1-1-1) and a group represented by the formula (1-1-2), from the viewpoint of soil release performance, an average addition molar number of —$R^{11}$—O— is preferably 20 or less, more preferably 10 or less, still more preferably 5 or less, yet still more preferably 3 or less, and even yet still more preferably 1 or less, and it is preferably 0 or more.

In the case where the group represented by the formula (1) contains a group represented by the formula (1-4), from the viewpoint of soil release performance, an average addition molar number of —$R^{12}$—O— in the formula (1-4) is preferably 20 or less, more preferably 10 or less, still more preferably 5 or less, yet still more preferably 3 or less, and even yet still more preferably 1 or less, and it is preferably 0 or more.

The formula (1-1-1) and formula (1-1-2) are each a group derived from a glycidyl ((poly)alkyleneoxy)hydrocarbyl ether, and Z is a group derived from an oxyglycidyl group or a (poly)alkyleneoxyglycidyl group. The group represented by the formula (1-1-1) or formula (1-1-2) is obtained by using, as an introducing agent (hereinafter also referred to as "hydrophobizing agent") of the hydrophobic group, a glycidyl ((poly)alkyleneoxy)hydrocarbyl ether, preferably a glycidyl ((poly)alkyleneoxy)alkyl ether, and more preferably a glycidyl alkyl ether.

The formula (1-2-1) and formula (1-2-2) are each a group in which Z is derived from an epoxy group. The group represented by each of the formula (1-2-1) and formula (1-2-2) is obtained by using, as a hydrophobizing agent, a terminal-epoxidized hydrocarbon, and preferably a terminal-epoxidized alkane.

The formula (1-3) is the case where the hydrophobic group is bound directly to a group resulting from eliminating a hydrogen atom from a hydroxy group of the hydroxyalkyl cellulose. The group represented by the formula (1-3) is obtained by using, as a hydrophobizing agent, a halogenated hydrocarbon.

The formula (1-4) contains a group in which Z contains a carbonyl group. The group represented by the formula (1-4) is obtained by using, as a hydrophobizing agent, $R^1$—C(=O)—OH, $R^1$—C(=O)-A (A represents a halogen atom), $R^1$—C(=O)—O—(=C)—$R^1$, or the like.

Of these, from the standpoint that a salt is not formed as a by-product during production of the hydroxyalkyl cellulose (A) as well as the viewpoint of soil release performance, the group represented by the formula (1) is preferably the group represented by the formula (1-1-1), formula (1-1-2), formula (1-2-1), or formula (1-2-2), and more preferably the group represented by the formula (1-1-1) or formula (1-1-2).

In the hydrophobic group represented by the formula (1), the total content of the hydrophobic group represented by the formula (1-1-1), the hydrophobic group represented by the formula (1-1-2), the hydrophobic group represented by the formula (1-2-1), the hydrophobic group represented by the formula (1-2-2), the hydrophobic group represented by the formula (1-3), and the hydrophobic group represented by the formula (1-4) is preferably 50 mol %, more preferably 80 mol % or more, and still more preferably 90 mol % or more, and it is 100 mol % or less, and still more preferably 100 mol %.

From the viewpoint of soil release performance, a degree of substitution of the hydrophobic group (hereinafter also referred to as "$MS_R$") in the hydroxyalkyl cellulose (A) is preferably 0.0001 or more, more preferably 0.001 or more, still more preferably 0.005 or more, yet still more preferably 0.008 or more, even yet still more preferably 0.01 or more, and even still more preferably 0.015 or more, and from the viewpoint of solubility, it is preferably 1 or less, more preferably 0.4 or less, still more preferably 0.2 or less, yet still more preferably 0.1 or less, even yet still more preferably 0.08 or less, even still more preferably 0.06 or less, even still more further preferably 0.05 or less, even yet still more further preferably 0.04 or less, and even yet still more further preferably 0.03 or less.

In the present invention, from the viewpoint of soil release performance, a ratio ($MS_R/MS_C$) of the degree of substitution ($MS_R$) of the hydrophobic group to the degree of substitution ($MS_C$) of the cationic group in the hydroxyalkyl cellulose (A) is preferably 0.001 or more, more preferably 0.005 or more, still more preferably 0.01 or more, and yet still more preferably 0.05 or more, and it is preferably 10 or less, more preferably 5 or less, still more preferably 3 or less, yet still more preferably 2 or less, even still more preferably 1.2 or less, even still more preferably 0.8 or less, even still more further preferably 0.6 or less, even yet still more further preferably 0.5 or less, and even yet still more further preferably 0.3 or less.

In the present invention, in the case where the hydroxyalkyl cellulose (A) has both the hydrophobic group and the cationic group, the hydrophobic group and the cationic group may be bound on a different side chain from each other, or the hydrophobic group and the cationic group may exist on one side chain. From the viewpoint of soil release performance, it is preferred that the hydrophobic group and the cationic group are bound to a group resulting from eliminating a hydrogen atom of a different hydroxy group which the hydroxyalkyl cellulose has. That is, it is preferred that the hydrophobic group and the cationic group are bound on a different side chain of the hydroxyalkyl cellulose.

In the case where the hydroxyalkyl cellulose (A) has the cationic group and the hydrophobic group on one side chain, it is preferred that the hydroxyalkyl cellulose (A) has a group represented by the following formula (3-1) or (3-2).

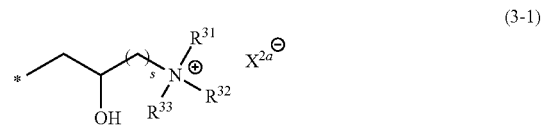

(3-1)

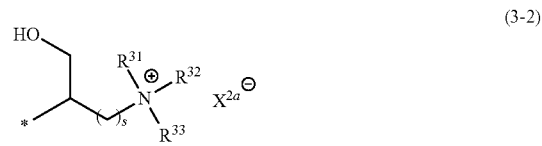

(3-2)

In the formula (3-1) and formula (3-2), $R^{31}$ to $R^{33}$ each independently represent a hydrocarbon group having 1 or more and 24 or less carbon atoms; at least one of $R^{31}$ to $R^{33}$ represents a hydrocarbon group having 4 or more carbon atoms; $X^{2a-}$ represents an anion; s represents an integer of 0 or more and 3 or less; and * represents a binding position to a group resulting from eliminating a hydrogen atom from a hydroxy group of the hydroxyalkyl cellulose.

At least one of $R^{31}$ to $R^{33}$ represents a hydrocarbon group having 4 or more carbon atoms, and it is preferably an alkyl group or an alkenyl group, more preferably an alkyl group, still more preferably a linear or branched alkyl group, and yet still more preferably a linear alkyl group.

From the viewpoint of soil release performance, the carbon number of at least one of $R^{31}$ to $R^{33}$ is 4 or more, preferably 6 or more, more preferably 8 or more, still more preferably 10 or more, and yet still more preferably 12 or more, and it is preferably 24 or less, more preferably 22 or less, still more preferably 18 or less, yet still more preferably 16 or less, and even yet still more preferably 14 or less.

It is preferred that one of $R^{31}$ to $R^{33}$ represents a hydrocarbon group having 4 or more carbon atoms, and two of them are a hydrocarbon group having 1 to 3 carbon atoms. Preferably, the hydrocarbon group having 1 to 3 carbon atoms is a methyl group or an ethyl group; more preferably, two of $R^{31}$ to $R^{33}$ are a methyl group or an ethyl group; and still more preferably, two of $R^{31}$ to $R^{33}$ are a methyl group.

s is preferably an integer of 1 or more and 3 or less, more preferably 1 or 2, and still more preferably 1.

$X^{2a-}$ is a counter ion of the quaternary ammonium cation. Specifically, examples thereof include an alkyl sulfate ion having 1 or more and 3 or less carbon atoms, a sulfate ion, a phosphate ion, a carboxylate ion having 1 or more and 3 or less carbon atoms (e.g., a formate ion, an acetate ion, and a propionate ion), and a halide ion.

Of these, from the viewpoint of easiness of production and easiness of raw material availability, $X^{2a-}$ is preferably at least one selected from a methyl sulfate ion, an ethyl sulfate ion, a chloride ion, and a bromide ion, and from the viewpoint of solubility in water and chemical stability of the resulting modified hydroxyalkyl cellulose, $X^{2a-}$ is more preferably a chloride ion.

$X^{2a-}$ may be alone or may be in combination of two or more thereof.

The hydroxyalkyl cellulose (A) having the group represented by the formula (3-1) or formula (3-2) can be, for example, obtained by allowing an introducing agent of the cationic group and the hydrophobic group to act in a production process of the hydroxyalkyl cellulose (A) as mentioned later. Preferred examples of the introducing agent include glycidyldimethyllaurylammonium chloride and glycidyldiethyllaurylammonium chloride.

The introducing agent can be used alone or in combination of two or more thereof.

In the present invention, the hydroxyalkyl cellulose (A) may have an anionic group. From the viewpoint of soil release performance, a ratio ($MS_A/MS_C$) of a degree of substitution of the anionic group (hereinafter also reference to as "$MS_A$") to the degree of substitution of the cationic group in the hydroxyalkyl cellulose (A) is preferably 3 or less, more preferably 1.7 or less, still more preferably 1.5 or less, yet still more preferably 1 or less, even yet still more preferably 0.5 or less, and even still more preferably 0.1 or less, and it may be 0 or more, and even yet still more further preferably 0.

From the viewpoint of soil release performance, the $MS_A$ is preferably less than 0.01, and more preferably 0.001 or less.

In the case where the hydroxyalkyl cellulose (A) has the anionic group, examples of the anionic group include a carboxymethyl group.

The introduction reaction of the carboxymethyl group (carboxymethylation reaction) is performed by allowing the hydroxyalkyl cellulose to react with a monohalogenated acetic acid and/or its metal salt in the presence of a basic compound.

Specifically, examples of the monohalogenated acetic acid and the monohalogenated acetic acid metal salt include monochloroacetic acid, sodium monochloroacetate, potassium monochloroacetate, sodium monobromoacetate, and potassium monobromoacetate. Such a monohalogenated acetic acid and its metal salt can be used either alone or in combination of two or more thereof.

In the present invention, the hydroxyalkyl cellulose (A) may have a glycerol group as a substituent. From the viewpoint of soil release performance, a degree of substitution of the glycerol group is preferably less than 0.5, and more preferably less than 0.1, and it may be 0 or more, and still more preferably 0.

The hydroxyalkyl cellulose (A) having a glycerol group is, for example, obtained by allowing a glycerolizing agent to act in a production process of the hydroxyalkyl cellulose (A) as mentioned later. Examples of the glycerolizing agent include glycidol, 3-chloro-1,2-propanediol, 3-bromo-1,2-propanediol, glycerin, and glycerin carbonate. Of these, glycidol is preferred from the standpoint that a salt is not formed as a by-product as well as the viewpoint of reactivity.

<Production Method of Hydroxyalkyl Cellulose (A)>

In the present invention, it is preferred that the hydroxyalkyl cellulose (A) is obtained by allowing the hydroxyalkyl cellulose to react with at least one selected from the cationizing agent and the hydrophobizing agent, to introduce the cationic group and the hydrophobic group.

It is preferred that all of the introduction reaction of the cationic group (hereinafter also referred to as "cationization reaction") and the introduction reaction of the hydrophobic group (hereinafter also referred to as "hydrophobization reaction") in the coexistence of a basic compound. From the viewpoint of reaction rate in introduction reaction, the basic compound is preferably an alkali metal hydroxide, and more preferably sodium hydroxide or potassium hydroxide.

From the viewpoint of reactivity, the aforementioned reaction may be performed in the presence of a nonaqueous solvent. Examples of the nonaqueous solvent include a polar solvent, such as 2-propanol.

After the reaction, the basic compound can be neutralized with an acid. Examples of the acid include an inorganic acid, such as phosphoric acid, and an organic acid, such as acetic acid.

The resulting modified hydroxyalkyl cellulose may be purified through filtration, washing, or the like, as the need arises.

<Surfactant (B)>

In the fabric treatment composition of the present invention, the content of the surfactant (B) is 3.5 parts by mass or less relative to 1 part by mass of the hydroxyalkyl cellulose (A).

From the viewpoint of soil release performance, the content of the surfactant (B) in the fabric treatment composition is 3.5 parts by mass or less, preferably 3 parts by mass or less, more preferably 2 parts by mass or less, still more preferably 1.5 parts by mass or less, and yet still more preferably 1.2 parts by mass or less, and it is preferably 0 part by mass or more, more preferably 0.1 parts by mass or more, still more preferably 0.2 parts by mass or more, yet still more preferably 0.5 parts by mass or more, and even yet still more preferably 0.8 parts by mass or more, relative to 1 part by mass of the hydroxyalkyl cellulose (A).

Examples of the surfactant (B) include an anionic surfactant, a nonionic surfactant, and an amphoteric surfactant.

(Anionic Surfactant)

Examples of the anionic surfactant include a terminal anionic surfactant in which an anionic group is bound to a hydrophobic group of a surfactant, preferably a primary carbon atom of an alkyl group or a phenyl group; and an internal anionic surfactant in which an anionic group is bound to a hydrophobic group, preferably a secondary carbon atom of an alkyl group.

Examples of the terminal anionic surfactant include at least one anionic surfactant selected from an alkylbenzenesulfonate (LAS), an α-olefin sulfonate, an alkyl sulfate ester salt (AS), a polyoxyalkylene alkyl ether sulfate (AES), an α-sulfo fatty acid ester salt, and a fatty acid salt. Examples of the internal anionic surfactant include internal olefin sulfate olefin body (IOS) and hydroxy body (HAS), as described in paragraph [00111] of JP 2015-028123 A.

Of these, at least one anionic surfactant selected from LAS, AS, AES, IOS, and HAS is preferred from the viewpoint of soil release performance. The carbon number of the alkyl group of the terminal anionic surfactant is preferably 8 or more, more preferably 10 or more, and still more preferably 12 or more, and it is preferably 18 or less, more preferably 16 or less, and still more preferably 14 or less. The carbon number of the alkyl group of the internal anionic surfactant is preferably 12 or more, more preferably 14 or more, and still more preferably 16 or more, and it is preferably 24 or less, more preferably 22 or less, and still more preferably 18 or less. The oxyalkylene group which AES has is preferably an ethyleneoxy group, and an average addition molar number thereof is preferably 0.5 or more, and more preferably 1 or more, and it is preferably 10 or less, and more preferably 5 or less.

As the salt of the anionic surfactant, a sodium salt, a potassium salt, and an ammonium salt are preferred. The use of the anionic surfactant is preferred from the viewpoint of the fact that the laundry liquid is slimy.

In the present invention, the anionic surfactant may be AS or AES represented by the following formula (16).

$$R^{51}O(A^{51}O)_m SO_3 M^{51} \tag{16}$$

In the formula, $R^{51}$ represents a hydrocarbon group having 8 or more and 20 or less carbon atoms; $A^{51}$ represents an alkylene group having 2 or more and 4 or less carbon atoms; $M^{51}$ represents a hydrogen atom, an alkali metal, or $NH_4$; and m is a number of 0 or more and 4 or less in terms of an average value.

The anionic surfactant may be used alone or may be used in combination of two or more thereof.

(Nonionic Surfactant)

Examples of the nonionic surfactant include one having a hydrophobic group, such as an alkyl group, and a nonionic hydrophilic group, such as a polyoxyethylene group. From the viewpoint of cleaning performance, the hydrophobic group is preferably a hydrocarbon group, and more preferably an alkyl group. From the viewpoint of enhancement in dispersibility of the modified hydroxyalkyl cellulose in water, the carbon number of the hydrophobic group is preferably 8 or more, more preferably 10 or more, and still more preferably 12 or more, and it is preferably 18 or less, more preferably 16 or less, and still more preferably 14 or less.

Examples of the nonionic surfactant include a nonionic surfactant having a polyoxyalkylene group, an alkyl polyglycoside, and an alkyl glyceryl ether. Of these, a nonionic surfactant having a polyoxyalkylene group is preferably, and at least one selected from a polyoxyalkylene alkyl ether, a polyoxyalkylene alkenyl ether, a polyoxyalkylene sorbitan fatty acid ester, a polyoxyalkylene fatty acid ester, and a polyoxyethylene/polyoxypropylene block polymer is more preferred from the viewpoint of cleaning performance; and a polyoxyalkylene alkyl ether is still more preferred from the standpoint that the dispersibility of the modified hydroxyalkyl cellulose in water is excellent.

From the viewpoint of cleaning performance, the oxyalkylene group is preferably an oxyethylene group or an oxypropylene group, and more preferably an oxyethylene group. The carbon number of the oxyalkylene group is preferably 2 or more and 3 or less.

From the viewpoint of enhancement in dispersibility of the modified hydroxyalkyl cellulose in water, an average addition molar number of the oxyalkylene group is preferably 5 or more, more preferably 6 or more, and still more preferably 7 or more, and it is preferably 20 or less, more preferably 18 or less, still more preferably 16 or less, yet still more preferably 14 or less, and even yet still more preferably 12 or less.

The nonionic surfactant may be used alone or may be used in combination of two or more thereof.

Examples of the amide-based nonionic surfactant include a fatty acid alkanol amide-based surfactant, and any of a monoalkanolamide and a dialkanolamide may be used. Ones having a hydroxyalkyl group having 2 to 3 carbon atoms are easily available, and examples thereof include oleic acid diethanolamide, a palm kernel oil fatty acid diethanolamide, a coconut oil fatty acid diethanolamide, lauric acid diethanolamide, a polyoxyethylene coconut oil fatty acid monoethanolamide, a coconut oil fatty acid monoethanolamide, lauric acid isopropanolamide, and lauric acid monoethanolamide. Of these, natural fatty acid diethanolamides are versatile, and examples thereof include a coconut fatty acid diethanolamide and a palm kernel oil fatty acid diethanolamide.

(Ampholytic Surfactant)

Examples of the amphoteric surfactant include an alkylamine oxide having an alkyl group or an acyl group having 8 to 18 carbon atoms, a carbobetaine, an amidobetaine, a sulfobetaine, an amidosulfobetaine, an imidazoliumbetaine, and a phosphobetaine. Specifically, examples thereof include a fatty acid amidopropylbetaine, a 2-alkyl-N-carboxymethyl-N-hydroxyethylimidazoliniumbetaine, an alkyldimethylamino acetic acid betaine, and an alkylhydroxysulfobetaine. Of these, a fatty acid amidopropylbetaine and a 2-alkyl-N-carboxymethyl-N-hydroxyethylimidazoliniumb etaine are preferred, and lauric acid amidopropylbetaine is more preferred.

In the case where the fabric treatment composition of the present invention contains the surfactant (B), the surfactant (B) is preferably at least one selected from an anionic surfactant and a nonionic surfactant. The surfactant (B) may be used alone or may be used in combination of two or more thereof.

<Other Component>

From the viewpoint of handling properties during use, it is preferred that the fabric treatment composition of the present invention contains water.

The fabric treatment composition of the present invention may contain an organic solvent, an alkaline agent, a chelating agent, a dispersant, or the like.

The fabric treatment composition of the present invention may be distributed in a concentrated state or in a non-solvent state in the market and used upon being diluted during use. The fabric treatment composition of the present invention may be used upon being added to a cleaning agent composition for clothes. Furthermore, other component may be added during use.

From the viewpoint of soil release performance, the content of the hydroxyalkyl cellulose (A) during use is preferably 0.00001% by mass or more, more preferably 0.0001% by mass or more, and still more preferably 0.001% by mass or more, and from the viewpoint of economy, it is preferably 10% by mass or less, more preferably 8% by mass or less, and still more preferably 5% by mass or less.

[Treatment Method of Fabric]

A method for treating a fabric of the present invention includes a step of impregnating a fabric to be treated with the fabric treatment composition of the present invention. As mentioned above, the fabric treatment composition of the present invention may be used upon being appropriately diluted, and other component may be added during use.

From the viewpoint of enhancement in adsorption properties of the hydroxyalkyl cellulose (A) on the fabric to be treated, the temperature at which the fabric to be treated is impregnated is preferably 0° C. or higher, more preferably 10° C. or higher, and still more preferably 20° C. or higher, and from the viewpoint of easiness of handling properties, it is preferably 100° C. or lower, and more preferably 80° C. or lower.

From the viewpoint of adsorption properties of the hydroxyalkyl cellulose (A) on the fabric to be treated, the time at which the fabric to be treated is impregnated is preferably 1 minute or more, more preferably 3 minutes or more, and still more preferably 5 minutes or more, and from the viewpoint of productivity, it is preferably 60 minutes or less, more preferably 40 minutes or less, and still more preferably 30 minutes or less.

From the viewpoint of adsorption properties of the hydroxyalkyl cellulose (A) on the fabric to be treated, workability, and economy, a bath ratio on impregnating the fabric to be treated (volume (L) of the fabric treatment composition to 1 kg of the fabric to be treated) is preferably 0.3 or more, more preferably 1 or more, still more preferably 3 or more, yet still more preferably 10 or more, and even yet still more preferably 20 or more, and it is preferably 500 or less, more preferably 200 or less, still more preferably 100 or less, and yet still more preferably 70 or less.

From the viewpoint of soil release performance, % owf of the hydroxyalkyl cellulose (A) on impregnating the fabric to be treated (mass % of the hydroxyalkyl cellulose (A) relative to the mass of the fabric to be treated (on the weight of fiber)) is preferably 0.001 or more, more preferably 0.005 or more, still more preferably 0.01 or more, yet still more preferably 0.02 or more, and even yet still more preferably 0.05 or more, and from the viewpoint of workability and economy, it is preferably 5 or less, more preferably 2 or less, still more preferably 0.5 or less, and yet still more preferably 0.25 or less.

In the present invention, it is preferred that after the treatment, the fabric having been impregnated with the fabric treatment composition is subjected to a rinsing step and a drying step. As for the rinsing step and the drying step, though only one of them may be performed, it is more preferred to perform the rinsing step and the drying step in this order.

In the rinsing step, the fabric having been impregnated with the fabric treatment composition is rinsed to wash away the excessive fabric treatment composition. In the drying step, the treated fabric which has become wet owing to impregnation with the fabric treatment liquid or rinsing is dried. In the present invention, it is preferred that the treated fabric is used in a dry state.

In the present invention, from the viewpoint of obtaining a high soil release performance, the fabric to be treated is preferably a fabric having a hydrophobic surface, and more preferably a fabric made of a hydrophobic fiber.

Examples of the hydrophobic fiber include a polyester fiber, a nylon fiber, an acrylic fiber, a triacetate fiber, a diacetate fiber, a polyamide fiber, and a mixed fiber using two or more kinds of these fibers. Mixed fibers of such a fiber with a regenerated fiber, such as rayon, or a natural fiber, such as cotton, silk, and wool, are also included in the hydrophobic fiber in this specification. Above all, as the hydrophobic fiber to be treated, at least one selected from a polyester fiber, a nylon fiber, and an acrylic fiber is preferred, and a polyester fiber is more preferred.

From the viewpoint of obtaining a high soil release performance, the cellulose content of the fabric to be treated is preferably 90% by mass or less, more preferably 50% by mass or less, and still more preferably 10% by mass or less, and it is 0% by mass or more and may be 0% by mass.

From the same viewpoint as mentioned above, the fabric to be treated preferably includes a hydrophobic fiber, and the content of the hydrophobic fiber in the fabric is preferably 10% by mass or more, more preferably 50% by mass or more, and still more preferably 90% by mass or more, and it is 100% by mass or less and may be 100% by mass.

The hydrophobicity of the fabric to be treated can be, for example, evaluated in terms of a distance (water absorption index, unit: cm) of an aqueous dye which vertically spreads for 15 minutes owing to chromatography when a lower part of the fabric disposed vertically against the water surface is dipped in ion-exchanged water at 25° C. It is expressed that the smaller the water absorption index, the higher the hydrophobicity is. In the present invention, from the viewpoint of obtaining a high soil release performance, the water absorption index of the fabric to be treated is preferably 10 or less, more preferably 8 or less, and still more preferably 7 or less, and it is 0 or more.

The water absorption index can be measured by the method described in the section of Examples.

While the "fabric" to be treated originally means a "woven fabric", the "fabric" to be treated in the present invention is not limited to the woven fabric, and it includes all of knitted fabrics inclusive of a woven fabric, a knit, a lace, and the like, and nonwoven fabrics inclusive of a felt. Above all, from the viewpoint that a high soil release performance is provided by the fabric treatment agent of the present invention, the fabric to be treated is preferably a fabric having a smooth surface; more preferably a woven fabric, a knitted fabric, or a felt; still more preferably a woven fabric or a felt; and yet still more preferably a woven fabric.

A surface roughness of the fabric to be treated can be, for example, measured through calculation of an arithmetic average height Sa which is obtained by performing image analysis processing in observation with an optical microscope while continuously changing the focus. From the viewpoint of obtaining a high soil release performance, the surface roughness of the fabric to be treated is preferably 100 µm or less, and more preferably 30 µm or less, and it is 10 µm or more.

The arithmetic average height Sa and the surface roughness can be measured by the method described in the section of Examples.

The performance which is provided through the treatment of the fabric to be treated is not particularly limited, and examples thereof include heat storage, prevention of static charge, electromagnetic wave shielding, fireproofing, heat proofing, windbreaking, waterproofing, soil prevention, and soil removal.

Above all, it is especially preferred to treat the fabric to be treated for the purpose of soil prevention or soil removal.

[Treated Fabric]

The treated fabric of the present invention is a fabric having been treated by the aforementioned treatment method of a fabric. The treated fabric of the present invention is excellent in the soil release performance.

In the present invention, the treated fabric may be a sewn cloth or may be a fabric before sewing.

The present invention further discloses the following <1> to <127>.

<1> A fabric treatment composition containing a hydroxyalkyl cellulose (A) in which a hydroxyalkyl cellulose is bound to at least one selected from a cationic group and a hydrophobic group including a hydrocarbon group having 4 or more carbon atoms, the content of a surfactant (B) being 3.5 parts by mass or less relative to 1 part by mass of the hydroxyalkyl cellulose (A).

<2> The fabric treatment composition as set forth in <1>, wherein the hydroxyalkyl cellulose (A) is bound to at least one selected from the cationic group and the hydrophobic group.

<3> The fabric treatment composition as set forth in <1> or <2>, wherein the hydroxyalkyl cellulose (A) is bound to both of the cationic group and the hydrophobic group.

<4> The fabric treatment composition as set forth in any of <1> to <3>, wherein the hydroxyalkyl cellulose (A) is hydroxyethyl cellulose (A).

<5> The fabric treatment composition as set forth in any of <1> to <4>, wherein the degree of substitution of the hydroxyalkyl group in the hydroxyalkyl cellulose is 1.5 or more.

<6> The fabric treatment composition as set forth in any of <1> to <5>, wherein the degree of substitution of the hydroxyalkyl group in the hydroxyalkyl cellulose is 3 or less.
<7> The fabric treatment composition as set forth in any of <1> to <6>, wherein the weight average molecular weight of the hydroxyalkyl cellulose is 130,000 or more.
<8> The fabric treatment composition as set forth in any of <1> to <7>, wherein the weight average molecular weight of the hydroxyalkyl cellulose is 1,200,000 or less.
<9> The fabric treatment composition as set forth in any of <1> to <7>, wherein the weight average molecular weight of the hydroxyalkyl cellulose is 790,000 or less.
<10> The fabric treatment composition as set forth in any of <1> to <7>, wherein the weight average molecular weight of the hydroxyalkyl cellulose is 400,000 or less.
<11> The fabric treatment composition as set forth in any of <1> to <10>, wherein the cationic group which the hydroxyalkyl cellulose (A) has includes a quaternary ammonium cation.
<12> The fabric treatment composition as set forth in any of <1> to <11>, wherein the cationic group which the hydroxyalkyl cellulose (A) has is represented by the formula (2-1) or formula (2-2).

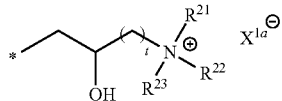 (2-1)

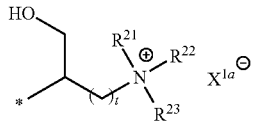 (2-2)

In the formula (2-1) and formula (2-2), $R^{21}$ to $R^{23}$ each independently represent a hydrocarbon group having 1 or more and 3 or less carbon atoms; $X^{1a-}$ represents an anion; t represents an integer of 0 or more and 3 or less; and * represents a binding position to a group resulting from eliminating a hydrogen atom from a hydroxy group of the hydroxyalkyl cellulose.
<13> The fabric treatment composition as set forth in <12>, wherein all of $R^{21}$ to $R^{23}$ are a methyl group or an ethyl group.
<14> The fabric treatment composition as set forth in <12>, wherein all of $R^{21}$ to $R^{23}$ are a methyl group.
<15> The fabric treatment composition as set forth in any of <12> to <14>, wherein t is 1.
<16> The fabric treatment composition as set forth in any of <12> to <15>, wherein $X^{1a-}$ is at least one selected from a methyl sulfate ion, an ethyl sulfate ion, a chloride ion, and a bromide ion.
<17> The fabric treatment composition as set forth in any of <12> to <15>, wherein $X^{1a-}$ is a chloride ion.
<18> The fabric treatment composition as set forth in any of <1> to <17>, wherein the degree of substitution of the cationic group ($MS_c$) in the hydroxyalkyl cellulose (A) is 0.01 or more.
<19> The fabric treatment composition as set forth in any of <1> to <17>, wherein the $MS_c$ is 0.02 or more.
<20> The fabric treatment composition as set forth in any of <1> to <17>, wherein the $MS_c$ is 0.05 or more.
<21> The fabric treatment composition as set forth in any of <1> to <17>, wherein the $MS_c$ is 0.07 or more.
<22> The fabric treatment composition as set forth in any of <1> to <21>, wherein the $MS_c$ is 0.2 or less.
<23> The fabric treatment composition as set forth in any of <1> to <21>, wherein the $MS_c$ is 0.15 or less.
<24> The fabric treatment composition as set forth in any of <1> to <21>, wherein the $MS_c$ is 0.1 or less.
<25> The fabric treatment composition as set forth in any of <1> to <24>, wherein the hydrocarbon group which the hydrophobic group includes is an alkyl group.
<26> The fabric treatment composition as set forth in any of <1> to <25>, wherein the carbon number of the hydrocarbon group which the hydrophobic group includes is 6 or more.
<27> The fabric treatment composition as set forth in any of <1> to <25>, wherein the carbon number of the hydrocarbon group which the hydrophobic group includes is 8 or more.
<28> The fabric treatment composition as set forth in any of <1> to <25>, wherein the carbon number of the hydrocarbon group which the hydrophobic group includes is 10 or more.
<29> The fabric treatment composition as set forth in any of <1> to <28>, wherein the carbon number of the hydrocarbon group which the hydrophobic group includes is 24 or less.
<30> The fabric treatment composition as set forth in any of <1> to <28>, wherein the carbon number of the hydrocarbon group which the hydrophobic group includes is 18 or less.
<31> The fabric treatment composition as set forth in any of <1> to <28>, wherein the carbon number of the hydrocarbon group which the hydrophobic group includes is 16 or less.
<32> The fabric treatment composition as set forth in any of <1> to <28>, wherein the carbon number of the hydrocarbon group which the hydrophobic group includes is 14 or less.
<33> The fabric treatment composition as set forth in any of <1> to <32>, wherein the hydrophobic group is a group represented by the following formula (1).

 (1)

In the formula (1), Z represents a single bond or a hydrocarbon group having at least one selected from an oxygen atom and a nitrogen atom; $R^1$ represents a hydrocarbon group having 4 or more carbon atoms; and * represents a binding position to a group resulting from eliminating a hydrogen atom from a hydroxy group of a hydroxyalkyl cellulose.
<34> The fabric treatment composition as set forth in <33>, wherein Z is a single bond or a hydrocarbon group having at least an oxygen atom.
<35> The fabric treatment composition as set forth in <33> or <34>, wherein the group represented by the formula (1) includes at least one selected from groups represented by any of the following formulae (1-1-1) to (1-4).

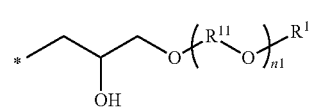 (1-1-1)

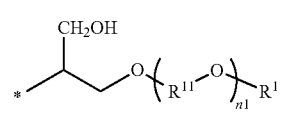 (1-1-2)

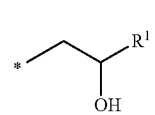 (1-2-1)

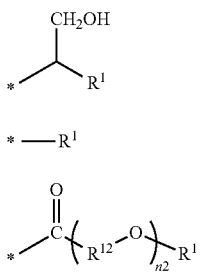

(1-2-2)

*—R¹   (1-3)

(1-4)

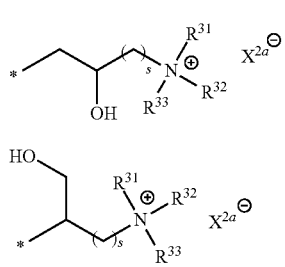

In the formula (1-1-1) to formula (1-4), $R^{11}$ and $R^{12}$ each independently represent an alkylene group having 2 to 4 carbon atoms; $R^1$ is synonymous with $R^1$ in the formula (1); * represents a binding position to a group resulting from eliminating a hydrogen atom from a hydroxy group of the hydroxyalkyl cellulose; n1 represents an addition molar number of —$R^{11}$—O—; n2 represents an addition molar number of —$R^{12}$—O—; and n1 and n2 are each an integer of 0 or more and 30 or less.

<36> The fabric treatment composition as set forth in <35>, wherein $R^{11}$ and $R^{12}$ are each an ethylene group.

<37> The fabric treatment composition as set forth in <35> or <36>, wherein the average addition molar number of each of —$R^{11}$—O— and —$R^{12}$—O— is 10 or less.

<38> The fabric treatment composition as set forth in <35> or <36>, wherein the average addition molar number of each of —$R^{11}$—O— and —$R^{12}$—O— is 3 or less.

<39> The fabric treatment composition as set forth in <35> or <36>, wherein the average addition molar number of each of —$R^{11}$—O— and —$R^{12}$—O— is 1 or less.

<40> The fabric treatment composition as set forth in any of <35> to <39>, wherein the average addition molar number of each of —$R^{11}$—O— and —$R^{12}$—O— is 0 or more.

<41> The fabric treatment composition as set forth in any of <35> to <40>, wherein n1 and n2 are each 20 or less.

<42> The fabric treatment composition as set forth in any of <35> to <40>, wherein n1 and n2 are each 10 or less.

<43> The fabric treatment composition as set forth in any of <35> to <40>, wherein n1 and n2 are each 5 or less.

<44> The fabric treatment composition as set forth in any of <35> to <40>, wherein n1 and n2 are each 3 or less.

<45> The fabric treatment composition as set forth in any of <35> to <40>, wherein n1 and n2 are each 1 or less.

<46> The fabric treatment composition as set forth in any of <35> to <45>, wherein n1 and n2 are each 0 or more.

<47> The fabric treatment composition as set forth in any of <35> to <40>, wherein n1 and n2 are each 0.

<48> The fabric treatment composition as set forth in any of <35> to <47>, wherein the group represented by the formula (1) includes at least one selected from the groups represented by the formula (1-1-1), formula (1-1-2), formula (1-2-1), and formula (1-2-2).

<49> The fabric treatment composition as set forth in any of <35> to <47>, wherein the group represented by the formula (1) includes at least one selected from the groups represented by the formula (1-1-1) and formula (1-1-2).

<50> The fabric treatment composition as set forth in any of <1> to <49>, wherein the degree of substitution of the hydrophobic group ($MS_R$) in the hydroxyalkyl cellulose (A) is 0.005 or more.

<51> The fabric treatment composition as set forth in any of <1> to <49>, wherein the $MS_R$ is 0.008 or more.

<52> The fabric treatment composition as set forth in any of <1> to <49>, wherein the $MS_R$ is 0.01 or more.

<53> The fabric treatment composition as set forth in any of <1> to <49>, wherein the $MS_R$ is 0.015 or more.

<54> The fabric treatment composition as set forth in any of <1> to <53>, wherein the $MS_R$ is 0.06 or less.

<55> The fabric treatment composition as set forth in any of <1> to <53>, wherein the $MS_R$ is 0.04 or less.

<56> The fabric treatment composition as set forth in any of <1> to <53>, wherein the $MS_R$ is 0.03 or less.

<57> The fabric treatment composition as set forth in any of <1> to <56>, wherein the ratio ($MS_R/MS_C$) of the degree of substitution of the hydrophobic group ($MS_R$) to the degree of substitution of the cationic group ($MS_C$) in the hydroxyalkyl cellulose (A) is preferably 0.001 or more, more preferably 0.005 or more, still more preferably 0.01 or more, and yet still more preferably 0.05 or more, and it is preferably 10 or less, more preferably 5 or less, still more preferably 3 or less, yet still more preferably 2 or less, even yet still more preferably 1.2 or less, even still more preferably 0.8 or less, even still more further preferably 0.5 or less, and even yet still more further preferably 0.3 or less.

<58> The fabric treatment composition as set forth in any of <1> to <57>, wherein the hydrophobic group and the cationic group are bound to a group resulting from eliminating a hydrogen atom of a different hydroxy group which the hydroxyalkyl cellulose has from each other.

<59> The fabric treatment composition as set forth in any of <1> to <58>, wherein the hydroxyalkyl cellulose (A) has the cationic group and the hydrophobic group on one side chain, and the hydroxyalkyl cellulose (A) has a group represented by the following formula (3-1) or (3-2).

(3-1)

(3-2)

In the formula (3-1) and formula (3-2), $R^{31}$ to $R^{33}$ each independently represent a hydrocarbon group having 1 or more and 24 or less carbon atoms; at least one of $R^{31}$ to $R^{33}$ represents a hydrocarbon group having 4 or more carbon atoms; $X^{2a-}$ represents an anion; s represents an integer of 0 or more and 3 or less; and * represents a binding position to a group resulting from eliminating a hydrogen atom from a hydroxy group of the hydroxyalkyl cellulose.

<60> The fabric treatment composition as set forth in <59>, wherein at least one of $R^{31}$ to $R^{33}$ is an alkyl group having 4 or more carbon atoms.

<61> The fabric treatment composition as set forth in <56> or <60>, wherein at least one of $R^{31}$ to $R^{33}$ has 12 or more carbon atoms.

<62> The fabric treatment composition as set forth in any of <56> to <61>, wherein at least one of $R^{31}$ to $R^{33}$ has 14 or less carbon atoms.

<63> The fabric treatment composition as set forth in any of <59> to <62>, wherein one of $R^{31}$ to $R^{33}$ is a hydrocarbon group having 4 or more carbon atoms, and two of them are a methyl group or an ethyl group.

<64> The fabric treatment composition as set forth in any of <59> to <62>, wherein one of $R^{31}$ to $R^{33}$ is a hydrocarbon group having 4 or more carbon atoms, and two of them are a methyl group.
<65> The fabric treatment composition as set forth in any of <59> to <64>, wherein s is 1.
<66> The fabric treatment composition as set forth in any of <59> to <65>, wherein $X^{2a-}$ is at least one selected from a methyl sulfate ion, an ethyl sulfate ion, a chloride ion, and a bromide ion.
<67> The fabric treatment composition as set forth in any of <59> to <65>, wherein $X^{2a-}$ is a chloride ion.
<68> The fabric treatment composition as set forth in any of <1> to <67>, wherein the ratio ($MS_A/MS_C$) of the degree of substitution of the anionic group ($MS_A$) to the degree of substitution of the cationic group ($MS_C$) in the hydroxyalkyl cellulose (A) is 0.5 or less.
<69> The fabric treatment composition as set forth in any of <1> to <67>, wherein the $MS_A/MS_C$ is 0.1 or less.
<70> The fabric treatment composition as set forth in any of <1> to <69>, wherein the $MS_A/MS_C$ is 0 or more.
<71> The fabric treatment composition as set forth in any of <1> to <67>, wherein the $MS_A/MS_C$ is 0.
<72> The fabric treatment composition as set forth in any of <1> to <71>, wherein the $MS_A$ is less than 0.01.
<73> The fabric treatment composition as set forth in any of <1> to <71>, wherein the $MS_A$ is 0.001 or less.
<74> The fabric treatment composition as set forth in any of <1> to <73>, wherein the degree of substitution of the glycerol group in the hydroxyalkyl cellulose (A) is less than 0.5.
<75> The fabric treatment composition as set forth in any of <1> to <73>, wherein the degree of substitution of the glycerol group is less than 0.1.
<76> The fabric treatment composition as set forth in any of <1> to <75>, wherein the degree of substitution of the glycerol group is 0 or more.
<77> The fabric treatment composition as set forth in any of <1> to <73>, wherein the degree of substitution of the glycerol group is 0.
<78> The fabric treatment composition as set forth in any of <1> to <77>, wherein the content of the surfactant (B) is 3 parts by mass or less relative to 1 part by mass of the hydroxyalkyl cellulose (A).
<79> The fabric treatment composition as set forth in any of <1> to <77>, wherein the content of the surfactant (B) is 2 parts by mass or less relative to 1 part by mass of the hydroxyalkyl cellulose (A).
<80> The fabric treatment composition as set forth in any of <1> to <77>, wherein the content of the surfactant (B) is 1.5 parts by mass or less relative to 1 part by mass of the hydroxyalkyl cellulose (A).
<81> The fabric treatment composition as set forth in any of <1> to <77>, wherein the content of the surfactant (B) is 1.2 parts by mass or less relative to 1 part by mass of the hydroxyalkyl cellulose (A).
<82> The fabric treatment composition as set forth in any of <1> to <81>, wherein the content of the surfactant (B) is 0 part by mass or more relative to 1 part by mass of the hydroxyalkyl cellulose (A).
<83> The fabric treatment composition as set forth in any of <1> to <81>, wherein the content of the surfactant (B) is 0.1 parts by mass or more relative to 1 part by mass of the hydroxyalkyl cellulose (A).
<84> The fabric treatment composition as set forth in any of <1> to <81>, wherein the content of the surfactant (B) is 0.2 parts by mass or more relative to 1 part by mass of the hydroxyalkyl cellulose (A).
<85> The fabric treatment composition as set forth in any of <1> to <81>, wherein the content of the surfactant (B) is 0.5 parts by mass or more relative to 1 part by mass of the hydroxyalkyl cellulose (A).
<86> The fabric treatment composition as set forth in any of <1> to <81>, wherein the content of the surfactant (B) is 0.8 parts by mass or more relative to 1 part by mass of the hydroxyalkyl cellulose (A).
<87> The fabric treatment composition as set forth in any of <1> to <86>, wherein the surfactant (B) is at least one selected from an anionic surfactant and a nonionic surfactant.
<88> The fabric treatment composition as set forth in <87>, wherein the anionic surfactant is selected from a terminal anionic surfactant in which an anionic group is bound to a hydrophobic group of a surfactant, preferably a primary carbon atom of an alkyl group or a phenyl group; and an internal anionic surfactant in which an anionic group is bound to a hydrophobic group, preferably a secondary carbon atom of an alkyl group.
<89> The fabric treatment composition as set forth in <87>, wherein the anionic surfactant is at least one selected from LAS, AS, AES, IOS, and HAS.
<90> The fabric treatment composition as set forth in <87>, wherein the anionic surfactant is AES.
<91> The fabric treatment composition as set forth in any of <87> to <90>, wherein the nonionic surfactant is a nonionic surfactant having a polyoxyalkylene group.
<92> The fabric treatment composition as set forth in any of <87> to <90>, wherein the nonionic surfactant is a polyoxyalkylene alkyl ether.
<93> The fabric treatment composition as set forth in any of <1> to <92>, wherein the fabric treatment composition contains water.
<94> The fabric treatment composition as set forth in any of <1> to <93>, wherein the content of the hydroxyalkyl cellulose (A) during use is preferably 0.00001% by mass or more, more preferably 0.0001% by mass or more, and still more preferably 0.001% by mass or more, and it is preferably 10% by mass or less, more preferably 8% by mass or less, and still more preferably 5% by mass or less.
<95> A method for treating a fabric, including a step of impregnating a fabric with the fabric treatment composition as set forth in any of <1> to <94>.
<96> The method for treating a fabric as set forth in <95>, wherein the fabric to be treated includes a hydrophobic fiber, and the content of the hydrophobic fiber in the fabric is 10% by mass or more.
<97> The method for treating a fabric as set forth in <95>, wherein the fabric to be treated includes a hydrophobic fiber, and the content of the hydrophobic fiber in the fabric is 50% by mass or more.
<98> The method for treating a fabric as set forth in <95>, wherein the fabric to be treated includes a hydrophobic fiber, and the content of the hydrophobic fiber in the fabric is 90% by mass or more.
<99> The method for treating a fabric as set forth in any of <95> to <98>, wherein the fabric to be treated includes a hydrophobic fiber, and the content of the hydrophobic fiber in the fabric is 100% by mass or less.

<100> The method for treating a fabric as set forth in <95>, wherein the fabric to be treated includes a hydrophobic fiber, and the content of the hydrophobic fiber in the fabric is 100% by mass.
<101> The method for treating a fabric as set forth in any of <95> to <100>, wherein the surface of the fabric to be treated is hydrophobic.
<102> The method for treating a fabric as set forth in any of <95> to <100>, wherein the fabric to be treated is a fabric made of a hydrophobic fiber.
<103> The method for treating a fabric as set forth in any of <96> to <102>, wherein the hydrophobic fiber is selected from a polyester fiber, a nylon fiber, a triacetate fiber, a diacetate fiber, a polyamide fiber, and a mixed fiber using two or more kinds of these fibers.
<104> The method for treating a fabric as set forth in any of <95> to <103>, wherein the water absorption index of the fabric to be treated is 10 or less.
<105> The method for treating a fabric as set forth in any of <95> to <103>, wherein the water absorption index of the fabric to be treated is 8 or less.
<106> The method for treating a fabric as set forth in any of <95> to <103>, wherein the water absorption index of the fabric to be treated is 7 or less.
<107> The method for treating a fabric as set forth in any of <95> to <106>, wherein the water absorption index of the fabric to be treated is 0 or more.
<108> The method for treating a fabric as set forth in any of <95> to <107>, wherein the cellulose content of the fabric to be treated is 90% by mass or less.
<109> The method for treating a fabric as set forth in any of <95> to <107>, wherein the cellulose content of the fabric to be treated is 50% by mass or less.
<110> The method for treating a fabric as set forth in any of <95> to <107>, wherein the cellulose content of the fabric to be treated is 10% by mass or less.
<111> The method for treating a fabric as set forth in any of <95> to <110>, wherein the bath ratio on impregnating the fabric to be treated (volume (L) of the fabric treatment composition to 1 kg of the fabric to be treated) is preferably 0.3 or more, more preferably 1 or more, still more preferably 3 or more, yet still more preferably 10 or more, and even yet still more preferably 20 or more, and it is preferably 500 or less, more preferably 200 or less, still more preferably 100 or less, and yet still more preferably 70 or less.
<112> The method for treating a fabric as set forth in any of <95> to <111>, wherein the % owf of the hydroxyalkyl cellulose (A) on impregnating the fabric to be treated (mass % of the hydroxyalkyl cellulose (A) relative to the mass of the fabric to be treated (on the weight of fiber)) is 0.001 or more.
<113> The method for treating a fabric as set forth in any of <95> to <111>, wherein the % owf of the hydroxyalkyl cellulose (A) on impregnating the fabric to be treated is 0.005 or more.
<114> The method for treating a fabric as set forth in any of <95> to <111>, wherein the % owf of the hydroxyalkyl cellulose (A) on impregnating the fabric to be treated is 0.01 or more.
<115> The method for treating a fabric as set forth in any of <95> to <111>, wherein the % owf of the hydroxyalkyl cellulose (A) on impregnating the fabric to be treated is 0.02 or more.
<116> The method for treating a fabric as set forth in any of <95> to <111>, wherein the % owf of the hydroxyalkyl cellulose (A) on impregnating the fabric to be treated is 0.05 or more.
<117> The method for treating a fabric as set forth in any of <95> to <116>, wherein the % owf of the hydroxyalkyl cellulose (A) on impregnating the fabric to be treated is 5 or less.
<118> The method for treating a fabric as set forth in any of <95> to <116>, wherein the % owf of the hydroxyalkyl cellulose (A) on impregnating the fabric to be treated is 2 or less.
<119> The method for treating a fabric as set forth in any of <95> to <116>, wherein the % owf of the hydroxyalkyl cellulose (A) on impregnating the fabric to be treated is 0.5 or less.
<120> The method for treating a fabric as set forth in any of <95> to <116>, wherein the % owf of the hydroxyalkyl cellulose (A) on impregnating the fabric to be treated is 0.25 or less.
<121> The method for treating a fabric as set forth in any of <95> to <120>, wherein the surface roughness of the fabric to be treated is 100 μm or less.
<122> The method for treating a fabric as set forth in any of <95> to <120>, wherein the surface roughness of the fabric to be treated is 30 μm or less.
<123> The method for treating a fabric as set forth in any of <95> to <122>, wherein the surface roughness of the fabric to be treated is 10 μm or more.
<124> The method for treating a fabric as set forth in any of <95> to <123>, further including, after the step of impregnating the fabric to be treated, a step of rinsing the impregnated fabric (rinsing step).
<125> The method for treating a fabric as set forth in any of <95> to <123>, further including, after the step of impregnating the fabric to be treated, a step of rinsing the impregnated fabric (rinsing step) and a step of drying (drying step).
<126> A fabric treated by the method as set forth in any of <95> to <125>.
<127> Use for treating the fabric to be treated of the fabric treatment composition as set forth in any of <1> to <94>.

EXAMPLES

The measuring methods adopted in Examples and Comparative Examples are as follows.

<Measurement of Water Absorption Index>

A rectangular fabric piece having a size of 0.03 cm in thickness, 25 cm in long side length, and 2.5 cm in short side length was used. A mark was put with a black aqueous marker on a place of 0.5 cm along the long side direction from an end of the short side of the fabric piece. Starting from the place put with the mark as 0 cm, a mark was put at every 1 cm interval along the long side direction until it reached 20 cm at maximum. The aforementioned fabric piece was disposed such that the long side direction thereof was made vertical against the surface of the water, while turning the direction marked at 0 cm downwards and turning the opposite short side upwards, respectively. The short side of the lower end of the fabric piece was dipped in ion-exchanged water at 25° C. such that the surface of the water was the height marked at 0 cm, followed by allowing to stand for 15 minutes. Among the tips at which the black ink spread owing to chromatography following a rise of water, a length (unit: cm) of from the position of the mark at 0 cm to the farthest tip was defined as the water absorption index. It is expressed that the smaller the water absorption index, the higher the hydrophobicity is.

<Measurement of Surface Roughness>

The surface of the fabric was observed with a digital microscope ("VHX-6000", manufactured by Keyence Corporation, quick combination & 3D mode, magnification: 100 times). A range of 3 mm×2 mm of the observed data was analyzed in a surface roughness measurement mode with a 3D shape measurement software ("VHZ-H4M", manufactured by Keyence Corporation), to calculate an arithmetic average height Sa (unit: μm) which is corresponding to an average value of a difference in height within the measurement range. The calculation of the aforementioned arithmetic average height Sa was performed with respect to five places on the surface of the fabric, and an average value thereof was defined as the surface roughness.

[Measurement of Degree of Substitution (Molar Average Degree of Substitution MS))]

Pretreatment 1 g of a powdery hydroxyalkyl cellulose was dissolved in 100 g of ion-exchanged water, and then, an aqueous solution was charged in a dialytic membrane (Spectra/Por, molecular weight cutoff: 1,000) and subjected to dialysis for 2 days. The resulting aqueous solution was freeze-dried with a freeze dryer (eyela, FDU1100), to obtain a purified hydroxyalkyl cellulose (A).

<Calculation of Mass of Cationic Group by Kjeldahl Method>

200 mg of the purified hydroxyalkyl cellulose (A) was accurately metered, to which were then added 10 mL of sulfuric acid and one tablet of a Kjeldahl tablet (manufactured by Merck), followed by undergoing thermal decomposition with a Kjeldahl decomposition apparatus (K-432, manufactured by BUCHI). After completion of decomposition, 30 mL of ion-exchanged water was added to the sample, and the nitrogen content (% by mass) of the sample was determined using an automatic Kjeldahl distillation apparatus (K-370, manufactured by BUCHI), thereby calculating the mass of the cationic group.

<Calculation of Mass of Hydrophobic Group (Alkyl Group) by Zeisel Method>

A calculation method of the mass of an alkyl group that is the hydrocarbon group is hereunder described while referring to the case of Example 1 (using lauryl glycidyl ether as an introducing agent of the hydrocarbon group) as an example. It is also possible to measure the case of using other introducing agent by appropriately selecting a sample for calibration curve (such as an iodoalkane and a hydrocarbon group-introducing agent).

200 mg of the purified cellulose derivative and 220 mg of adipic acid were accurately metered in a 10-mL vial (Mighty Vial No. 3), to which were then added 3 mL of an internal standard solution (tetradecane/o-xylene=1/25 (v/v)) and 3 mL of hydroiodic acid, followed by sealing up. In addition, a sample for calibration curve having 2, 4, or 9 mg of 1-iodododecane added thereto in place of the cellulose derivative was prepared. Each of the samples was heated under a condition at 160° C. for 2 hours by using a block heater (Reacti-ThermIII Heating/Stirring module, manufactured by PIERCE) while stirring with a stirrer chip. The sample was allowed to stand for cooling, and then, an upper layer (o-xylene layer) was recovered and analyzed for the amount of 1-iodododecane through gas chromatography (GC-2010 plus, manufactured by Shimadzu Corporation).

Condition for GC Analysis

Column: Agilent's HP-1 (length: 30 m, liquid phase membrane thickness: 0.25 μL, inner diameter: 32 mm)

Split ratio: 20

Column temperature: 100° C. (2 min)→10° C./min→300° C. (15 min)

Injector temperature: 300° C.

Detector: FID

Detector temperature: 330° C.

Amount of implantation: 2 μL

The mass of the alkyl group in the sample was determined from the detection amount of 1-iodododecane obtained through GC.

<Measurement of Mass of Hydroxyalkyl Group>

The mass of the alkyl group was measured in the same manner as in the aforementioned measurement of the mass of the alkyl group by quantitatively determining the hydroxyalkyl group-derived alkyl iodide.

<Calculation of Degree of Substitution (Molar Average Degree of Substitution) of Each of Cationic Group, Hydrophobic Group, and Hydroxyalkyl Group>

From the masses of the aforementioned cationic group and hydrophobic group (alkyl group) and the masses of all of the samples, the mass of the HEC structure was calculated and converted into a substance amount (mol), respectively, thereby calculating the degree of substitution ($MS_C$) of the cationic group and the degree of substitution ($MS_R$) of the alkyl group that is the hydrophobic group.

The raw materials used for the synthesis of the modified hydroxyalkyl cellulose are as follows.

Natrosol 250 GR: HEC (weight average molecular weight: 300,000, degree of substitution of hydroxyethyl group: 2.5, manufactured by Ashland Inc.)

IPA: 2-Propanol

LA-EP: Lauryl glycidyl ether, manufactured by Yokkaichi Chemical Co., Ltd.

1,2-Epoxytetradecane, manufactured by Wako Pure Chemical Industries, Ltd.

GMAC: Glycidyl trimethylammonium chloride, "SY-GTA80", manufactured by Sakamoto Yakuhin Kogyo Co., Ltd.

Synthesis Example 1

Synthesis of Hydroxyalkyl Cellulose (A) (M-HEC)

90 g of Natrosol 250 GR was charged in a 1-L separable flask, and nitrogen was allowed to pass therethrough. 77.2 g of ion-exchanged water and 414.5 g of IPA were added and stirred for 5 minutes, and then, 10.9 g of a 48% by mass sodium hydroxide aqueous solution was added, followed by further stirring for 15 minutes.

Subsequently, 4.2 g of LA-EP was added, to undergo a hydrophobization reaction at 80° C. for 13 hours. Furthermore, 8.6 g of GMAC was added, to undergo a cationization reaction at 50° C. for 1.5 hours. Thereafter, 10.9 g of a 90% by mass acetic acid aqueous solution was added, and stirring was performed for 30 minutes, to undergo a neutralization reaction.

Subsequently, the following operation was performed as a purification step.

The resulting suspension liquid was transferred equally into two 500-mL centrifuge tubes and centrifuged with a high-speed cooling centrifuge (CR21G III, manufactured by Hitachi Koki Co., Ltd.) at 1,500 G for 40 seconds. A supernatant was removed through decantation, and an 85% by mass IPA aqueous solution in the same amount as that of the removed supernatant was added, to undergo redispersion. Again, the operation of centrifugation and redispersion was repeated, and after performing the third centrifugation, a precipitate was taken out. The resulting precipitate was vacuum-dried at 80° C. for 12 hours or more by using a vacuum dryer (VR-420, manufactured by Advantec Co., Ltd.) and then crushed with an extreme mill (MX- 1200XTM, manufactured by Waring), to obtain a powdery hydroxyethyl cellulose (A) (M-HEC).

The degree of substitution of the cationic group ($MS_C$) and the degree of substitution of the hydrophobic group ($MS_R$) of the resulting M-HEC were 0.066 and 0.022, respectively.

Synthesis Example 2

Synthesis of Hydroxyalkyl Cellulose (A) (A-HEC)

90 g of Natrosol 250 GR was charged in a 1-L separable flask, and nitrogen was allowed to pass therethrough. 77.2 g of ion-exchanged water and 414.5 g of IPA were added and stirred for 5 minutes, and then, 10.9 g of a 48% by mass sodium hydroxide aqueous solution was added, followed by further stirring for 15 minutes. Subsequently, 20.6 g of 1,2-epoxytetradecane was added, to undergo a hydrophobization reaction at 80° C. for 13 hours.

The resulting suspension liquid was subjected to the same operation as in the purification step of Synthesis Example 1, to obtain a powdery hydroxyethyl cellulose (A) (A-HEC).

The degree of substitution of the hydrophobic group ($MS_R$) of the resulting A-HEC was 0.055.

Synthesis Example 3

Synthesis of Surfactant (C16 IOS)

In a flask equipped with a stirring device, 7,000 g of 1-hexadecanol (a product name: KALCOL 6098, manufactured by Kao corporation) and 700 g of γ-alumina (manufactured by Strem Chemicals, Inc.) were charged and allowed to react with each other at 280° C. for 3 hours or more under stirring while passing nitrogen (7,000 mL/min) into the system, thereby obtaining a crude internal olefin having a purity of the C16 olefin of 99.6%. The crude internal olefin was distilled at 136 to 160° C. and 4.0 mmHg, thereby obtaining an internal olefin having 16 carbon atoms and an olefin purity of 100%. The double bond distribution of the resulting internal olefin was as follows: C1 position: 2.3%; C2 position: 23.6%; C3 position: 18.9%; C4 position: 17.6%; C5 position: 13.6%; C6 position: 11.4%; and C7 and C8 positions: 7.4% in total.

The aforementioned internal olefin was charged in a thin-film sulfonation reactor and subjected to a sulfonation reaction with an $SO_3$ gas under a condition of passing cooling water at 20° C. through an external jacket of the reactor. A molar ratio of the reaction molar ratio [($SO_3$)/(internal olefin)] was set to 1.005. The resulting sulfonated product was mixed with a potassium hydroxide aqueous solution in an amount corresponding to 1.05 molar times relative to the theoretical acid value and neutralized at 30° C. for 1 hour. The neutralized product was heated in an autoclave at 170° C. for 1 hour to undergo hydrolysis. The resultant was decolored with hydrogen peroxide in an amount of 1.0% by mass relative to the sulfonated product and reduced with sodium sulfite in an amount of 0.15% by mass relative to the sulfonated product, thereby obtaining an internal olefin potassium sulfonate having 16 carbon atoms (C16 IOS).

A mass ratio (HAS/IOS) of the hydroxy body to the olefin body in the C16 IOS was found to be 84/16. The content of the raw material internal olefin in the solid component of the C16 IOS was 0.5% by mass, and the content of the inorganic compound was 1.2% by mass.

The following materials were used as the fabric to be treated.

Polyester fabric: "Polyester faille", manufactured by Senshoku Shizai Tanigashira Shoten K. K., polyester 100%, water absorption index=5.9, surface roughness Sa=15 μm Nylon fabric: "Nylon taffeta", manufactured by Senshoku Shizai Tanigashira Shoten K. K., nylon 100%, water absorption index=1.3

Acrylic fabric: "Acrylic taffeta", manufactured by Senshoku Shizai Tanigashira Shoten K. K., acryl 100%, water absorption index=7.7

Examples 1 to 18

Comparative Examples 1 to 6

[Evaluation of Soil Release Performance]
(1) Treatment Method of Fabric to be Treated A 100-mL sample bottle was charged with 100 mL (100 g) of a fabric treatment composition having a formulation shown in Table 1 and 5 sheets of polyester fabrics having been cut in a regular square of 6 cm×6 cm (2 g in total). The polyester fabrics were treated by shaking with a reciprocating shaker (TERAOKA SHAKER) at 20° C. and 300 r/min for 10 minutes. Subsequently, the polyester fabrics were dehydrated with a twin tub washing machine for 1 minute. The resulting polyester fabrics and 100 mL of water of 4° dH were charged in a 100-mL sample bottle. Using a reciprocating shaker, shaking was performed at room temperature and 300 r/min for 3 minutes, to undergo rinsing. Subsequently, the polyester fabrics were dehydrated with a twin tub washing machine for 1 minute and then naturally dried for 1 hour, to obtain the fabric of the present invention.

In Examples 11, 12, and 15 to 18 and Comparative Examples 4 to 6, the amount of the fabric treatment composition to be added in the sample bottle was changed, to regulate the bath ratio as shown in the tables.
<Formulation of Fabric Treatment Composition>

The compositions of the present invention were prepared in blending formulations as shown in Tables 1 and 2. Each of the blending amounts is expressed in terms of a solid component (amount of active component). Ion-exchanged water was blended such that the sum total of the composition was 100 parts by mass. The respective components used are as follows.

SL-5: "SoftCAT™ SL Polymer SL-5", manufactured by The Dow Chemical Company (compound in which the group represented by the formula (3-1) is bound to the group resulting from eliminating a hydrogen atom from a hydroxy group of hydroxyethyl cellulose; s=1, $R^{31}=C_{12}H_{25}$, $R^{32}=R^{33}=CH_3$, $X^{2a-}$: chloride ion)

C-60H: Cationized hydroxyethyl cellulose ("Poise C-60H", manufactured by Kao corporation)

QP 100MH: HEC ("CELLOSIZE™ QP 100MH", manufactured by The Dow Chemical Company, weight average molecular weight: 2,100,000, degree of substitution of hydroxyethyl group: 2.5)

C12 ES: Polyoxyethylene (3) lauryl ether sodium sulfate ("EMAL 20C", manufactured by Kao Corporation)

C16 IOS: C16 IOC obtained in Synthesis Example 3

C12 EO: Polyoxyethylene (5) lauryl ether ("EMULGEN 106", manufactured by Kao Corporation)

(2) Preparation of Soiled Fabric

After once cleaning the polyester fabrics prepared in the above (1) by a cleaning test method of (3), 0.1 mL of the following model sebum artificial soiled liquid was uniformly applied and then dried at 40° C. for 1 hour.

<Model Sebum Artificial Soiled Liquid>
  Oleic acid: 35% by mass
  Triolein: 30% by mass
  Squalene: 10% by mass
  2-Ethylhexyl palmitate: 25% by mass The foregoing mixture was mixed with 0.02% by mass Sudan III, to prepare the model sebum artificial soiled liquid.

(3) Cleaning Test

A surfactant [(polyoxyethylene (3) lauryl ether sodium sulfate)/(polyoxyethylene (10) lauryl ether)=1/1 (w/w)] was diluted with water of 4° dH such that its content was 150 mg/kg, to obtain a cleaning liquid. A 100-mL sample bottle was charged with 100 mL of the cleaning liquid and the five sheets of polyester fabrics obtained in the above (2). The polyester fabrics were cleaned by using a reciprocating shaker (TERAOKA SHAKER) under a condition at 300 r/min and 20° C. for 10 minutes. The resulting polyester fabrics and 100 mL of water of 4° dH were charged in a 100-mL sample bottle and rinsed by using the aforementioned reciprocating shaker under a condition at 300 r/min and 20° C. for 3 minutes. The resulting polyester fabrics were dehydrated with a twin tub washing machine for 1 minute and then naturally dried for 1 hour.

[Evaluation of Soil Release Performance]

Reflectances of a polyester raw fabric before soiling and the polyester fabrics before and after cleaning at 460 nm were measured with a spectrophotometer (SE-2000, manufactured by Nippon Denshoku Industries Co., Ltd.), and a cleaning rate (%) was determined according to the following equation.

Cleaning rate (%)=100×[{(Reflectance after cleaning)−(Reflectance before cleaning)}/{(Reflectance of raw fabric)−(Reflectance before cleaning)}]

In addition, in the treatment method of fabric of the above (1), a cleaning rate enhancement (%) was determined from a difference of the cleaning rate after performing the cleaning test of the soiled fabric from the blank in which the cleaning test of soiled fabric was performed by using a polyester fabric treated with ion-exchanged water in place of the fabric treatment composition. The higher the cleaning rate enhancement, the more excellent the soil release performance is.

Cleaning rate enhancement (%)=[{Cleaning rate (%) after treatment with soil release agent}−{Cleaning rate (%) of blank}]

TABLE 1

|  | Hydroxyalkyl cellulose (A) | | Surfactant (B) | | | | |
|  | Kind | Blending amount (parts by mass) | Kind | Blending amount (parts by mass) | Mass ratio (B)/(A) | Bath ratio | Cleaning rate enhancement (%) |
| --- | --- | --- | --- | --- | --- | --- | --- |
| Example 1 | M-HEC | 0.01 | — | — | 0 | 50 | 51 |
| Example 2 | C-60H | 0.01 | — | — | 0 | 50 | 48 |
| Example 3 | M-HEC | 0.005 | — | — | 0 | 50 | 49 |
| Example 4 | SL-5 | 0.005 | — | — | 0 | 50 | 43 |
| Example 5 | A-HEC | 0.005 | — | — | 0 | 50 | 45 |
| Example 6 | C-60H | 0.005 | — | — | 0 | 50 | 27 |
| Example 7 | C-60H | 0.001 | — | — | 0 | 50 | 22 |
| Example 8 | C-60H | 0.001 | C12 EO | 0.001 | 1 | 50 | 24 |
| Example 9 | C-60H | 0.001 | C12 ES | 0.001 | 1 | 50 | 30 |
| Example 10 | C-60H | 0.001 | C16 IOS | 0.001 | 1 | 50 | 23 |
| Example 11 | C-60H | 0.001 | C16 IOS | 0.001 | 1 | 20 | 19 |
| Example 12 | C-60H | 0.001 | C16 IOS | 0.001 | 1 | 10 | 13 |
| Example 13 | C-60H | 0.001 | C16 IOS | 0.003 | 3 | 50 | 13 |
| Example 14 | C-60H | 0.001 | C16 IOS | 0.0035 | 3.5 | 50 | 12 |
| Comparative Example 1 | C-60H | 0.001 | C16 IOS | 0.004 | 4 | 50 | 7 |
| Comparative Example 2 | C-60H | 0.001 | C16 IOS | 0.006 | 6 | 50 | 6 |
| Comparative Example 3 | QP 100MH | 0.01 | — | — | 0 | 50 | 14 |
| Comparative Example 4 | No | — | — | — | — | 50 | 0 |

TABLE 2

|  | Hydroxyalkyl cellulose (A) | | Surfactant (B) | | | | |
|  | Kind | Blending amount (parts by mass) | Kind | Blending amount (parts by mass) | Mass ratio (B)/(A) | Bath ratio | Cleaning rate enhancement (%) |
| --- | --- | --- | --- | --- | --- | --- | --- |
| Example 15 | M-HEC | 1 | — | — | 0 | 5 | 47 |
| Example 16 | SL-5 | 1 | — | — | 0 | 5 | 41 |
| Example 17 | C-60H | 1 | — | — | 0 | 5 | 34 |
| Example 18 | C-60H | 1 | C16 IOS | 1 | 1 | 5 | 15 |
| Comparative Example 4 | No | — | — | — | — | 5 | 0 |
| Comparative Example 5 | C-60H | — | C16 IOS | 6 | 6 | 5 | 7 |
| Comparative Example 6 | QP 100MH | 1 | — | — | 0 | 5 | 15 |

In Examples 1 to 18, by performing the aforementioned evaluation of soil release performance on the nylon fabric and the acrylic fabric in place of the polyester fabric, the same cleaning rate performance can be obtained.

As is clear from Table 1, it has been clarified that the attachment of the sebum soil is inhibited, and the soil release performance is enhanced through the treatment with the fabric treatment compositions of Examples 1 to 18 each containing the hydroxyalkyl cellulose (A) and having the content of the surfactant (B) of 3.5 parts by mass or less relative to 1 part by mass of the hydroxyalkyl cellulose (A).

On the other hand, in Comparative Examples 1 and 2 in which the content of the surfactant (B) is more than 3.5 parts by mass relative to 1 part by mass of the hydroxyalkyl cellulose (A), the sufficient soil release performance could not be obtained.

In addition, as shown in Comparative Examples 3 and 6, according to the hydroxyalkyl cellulose having neither the cationic group nor the hydrophobic group, the sufficient soil release performance was not obtained. On the other hand, according to the hydroxyalkyl cellulose (A) having either the hydrophobic group or the cationic group, the high soil release performance was exhibited. Furthermore, in the case of using M-HEC having both the cationic group and the hydrophobic group, the cationic group and the hydrophobic group being substituted on a different side chain of the hydroxyalkyl cellulose from each other, the higher soil release performance was obtained.

INDUSTRIAL APPLICABILITY

By treating a fabric with the fabric treatment composition of the present invention, the soil release performance can be enhanced. Furthermore, the fabric treatment composition of the present invention can be used when adding separately to various cleaning agent compositions, or can be used independently as a fabric treatment composition. By treating with such a composition, an extremely excellent effect for enhancing the soil release performance may be provided.

The invention claimed is:

1. A fabric treatment composition, comprising:
a hydroxyalkyl cellulose (A) in which a hydroxyalkyl cellulose is bound to at least one selected from a cationic group and a hydrophobic group including a hydrocarbon group having 4 or more carbon atoms,
wherein a content of a surfactant (B) in the composition is 3.5 parts by mass or less relative to 1 part by mass of the hydroxyalkyl cellulose (A), and
wherein the hydrophobic group including a hydrocarbon group having 4 or more carbon atoms includes at least one selected from a hydrophobic group represented by the following formula (1-1-1), a hydrophobic group represented by the following formula (1-1-2), a hydrophobic group represented by the following formula (1-2-2), and a hydrophobic group represented by the following formula (1-4):

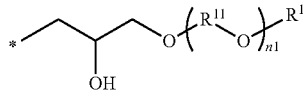
(1-1-1)

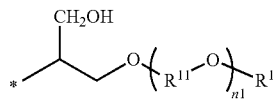
(1-1-2)

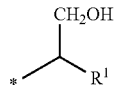
(1-2-2)

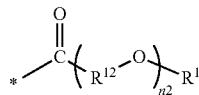
(1-4)

wherein:
$R^{11}$ and $R^{12}$ each independently represent an alkylene group having 2 to 4 carbon atoms;
$R^1$ represents a hydrocarbon group having 4 or more carbon atoms;
* represents a binding position to a group resulting from eliminating a hydrogen atom from a hydroxy group of the hydroxyalkyl cellulose;
n1 represents an addition molar number of —$R^{11}$—O—;
n2 represents an addition molar number of —$R^{12}$—O—; and
n1 and n2 are each an integer of 0 or more and 30 or less.

2. The fabric treatment composition according to claim 1, wherein in the hydroxyalkyl cellulose (A), the hydroxyalkyl cellulose is bound to the cationic group and the hydrophobic group including a hydrocarbon group having 4 or more carbon atoms.

3. The fabric treatment composition according to claim 1, wherein the cationic group includes a quaternary ammonium cation.

4. The fabric treatment composition according to claim 1, wherein the cationic group is represented by the formula (2-1) or formula (2-2):

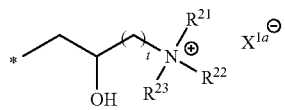
(2-1)

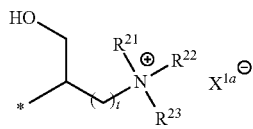
(2-2)

wherein:
$R^{21}$ to $R^{23}$ each independently represent a hydrocarbon group having 1 or more and 3 or less carbon atoms;
$X^{1a-}$ represents an anion;
t represents an integer of 0 or more and 3 or less; and
* represents a binding position to a group resulting from eliminating a hydrogen atom from a hydroxy group of the hydroxyalkyl cellulose.

5. The fabric treatment composition according to claim 1, wherein the hydroxyalkyl cellulose (A) has a group represented by the following formula (3-1) or (3-2):

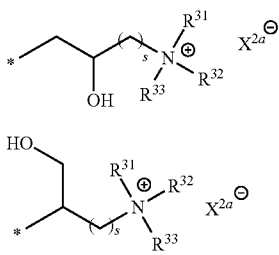

(3-1)

(3-2)

wherein:
R³¹ to R³³ each independently represent a hydrocarbon group having 1 or more and 24 or less carbon atoms, where at least one of R³¹ to R³³ represents a hydrocarbon group having 4 or more carbon atoms;
$X^{2a-}$ represents an anion;
s represents an integer of 0 or more and 3 or less; and
* represents a binding position to a group resulting from eliminating a hydrogen atom from a hydroxy group of the hydroxyalkyl cellulose.

6. The fabric treatment composition according to claim 5, wherein the hydroxyalkyl cellulose (A) has the group represented by formula (3-1).

7. The fabric treatment composition according to claim 5, wherein the hydroxyalkyl cellulose (A) has the group represented by formula (3-2).

8. The fabric treatment composition according to claim 5, wherein, in formulae (3-1) and (3-2), s represents an integer from 1 or more to 3 or less.

9. The fabric treatment composition according to claim 8, wherein, in formulae (3-1) and (3-2), s represents 1.

10. The fabric treatment composition according to claim 5, wherein, in formulae (3-1) and (3-2), at least one of R³¹ to R³³ represents a hydrocarbon group having 6 or more and 24 or less carbon atoms.

11. The fabric treatment composition according to claim 5, wherein, in formulae (3-1) and (3-2), at least two of R³¹ to R³³ represent a hydrocarbon group having 1 to 3 carbon atoms.

12. The fabric treatment composition according to claim 1, wherein a weight average molecular weight of the hydroxyalkyl cellulose is 1,000 or more and 3,000,000 or less.

13. The fabric treatment composition according to any of claims claim 1, wherein a degree of substitution of the hydrophobic group including a hydrocarbon group having 4 or more carbon atoms in the hydroxyalkyl cellulose (A) is 0.0001 or more and 1 or less.

14. The fabric treatment composition according to claim 1, wherein a degree of substitution of the cationic group in the hydroxyalkyl cellulose (A) is 0.001 or more and 1 or less.

15. The fabric treatment composition according claim 1, comprising water.

16. A method for treating a fabric, the method comprising:
impregnating a fabric to be treated with the fabric treatment composition according to claim 1.

17. The method for treating a fabric according to claim 16, wherein the cellulose content in the fabric to be treated is 90% by mass or less.

18. The fabric treatment composition according to claim 1, wherein a ratio ($MS_R/MS_C$) of the degree of substitution ($MS_R$) of the hydrophobic group to the degree of substitution ($MS_C$) of the cationic group in the hydroxyalkyl cellulose (A) is 0.001 or more and 10 or less.

19. The fabric treatment composition according to claim 1, wherein the hydrophobic group and the cationic group are bound on a different side chain of the hydroxyalkyl cellulose.

20. The fabric treatment composition according to claim 1, wherein the fabric to be treated is a fabric made of a hydrophobic fiber.

* * * * *